July 29, 1952 A. C. REENTS ET AL 2,605,084
METHOD OF MIXING GRANULAR MATERIALS
Filed Feb. 2, 1951
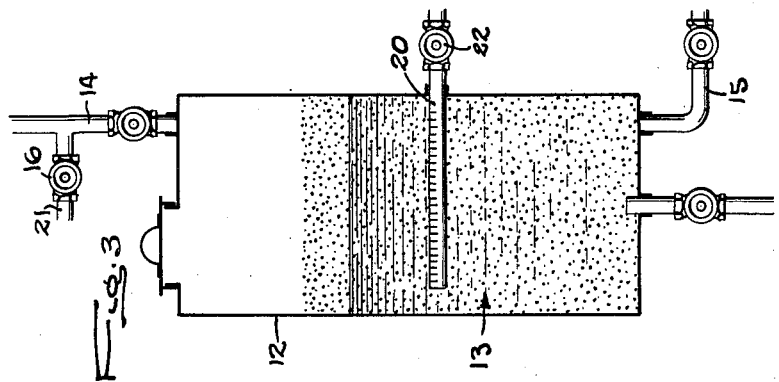
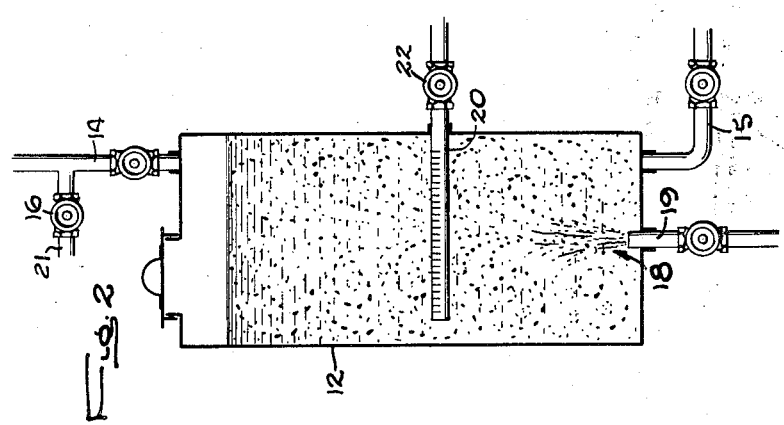
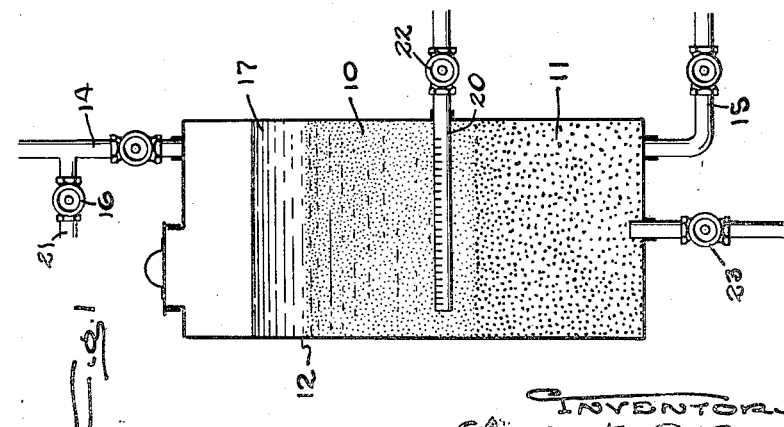
INVENTORS
August C. Reents
Donald M. Stromquist
By Carlson, Pitzner, Hubbard & Wolfe
ATTORNEYS Patented July 29, 1952

2,605,084

UNITED STATES PATENT OFFICE 2,605,084

METHOD OF MIXING GRANULAR MATERIALS

August C. Reents and Donald M. Stromquist, Rockford, Ill., assignors to Illinois Water Treatment Co., Rockford, Ill., a corporation of Illinois Application February 2, 1951, Serial No. 209,150

5 Claims. (Cl. 259—1)

1

The primary object of this invention is to provide a method of mixing granular materials of different densities to form the same into a homogeneous body.

A more detailed object is to place the different materials in a state of homogeneous suspension in a liquid body and then reduce the level of the liquid until the granules come into mechanical contact.

Other objects and advantages of the invention will become apparent from the following detailed description taken in connection with the accompanying drawings, in which Figures 1 to 3 are diagrammatic views illustrating successive steps in the new method.

While the invention may be practiced in apparatus of different character and with various kinds of granular materials, it is illustrated in the drawings and will be described herein as a method for mixing two bodies of granular material 10 and 11 while the latter are confined within a closed tank 12 in which the mixture 13 of the two materials may be later used as for the treatment of liquid passed through the conduits 14 and 15 at the top and bottom of the tank. As an example, the granules of the materials may pass a 10 mesh standard screen but not a 60 mesh screen. They are of different densities such for example as 1.5 in the case of the heavier material and 1.1 for the lighter material.

With the two bodies disposed in separate layers within the tank, water or other liquid 17 in which both of the materials 10 and 11 are insoluble is introduced into the tank in an amount somewhat greater than that required to fill the voids within the two layers and substantially in excess of that required to submerge the two bodies thus raising the liquid level well above the top of the materials as illustrated in Fig. 1. Then, the liquid is agitated quite violently to overcome the weight of the granules and place all of the latter in a state of free suspension in the liquid. While this may be achieved by mechanical or other suitable means, it is preferably accomplished by an air jet 18 directed into the liquid in the tank by admitting compressed air through a nozzle 19. At the same time, the top of the tank is vented through a valve controlled outlet 21. When all of the granules are moving freely in the turbulent body of liquid, they will be mixed together uniformly irrespective of their different densities.

To retain this condition of uniform mixture while the materials are being brought back into

2 mechanical contact with each other to form the mixed bed 13, the liquid is withdrawn gradually from the tank while the agitation is continued. Such withdrawal may be made at any point below the ultimate top of the mixed material bed 13 as through a pipe 20 having holes therein smaller than the granules of either of the materials. When, during such withdrawal, the volume of the liquid is reduced below the volume of the voids in the ultimate bed 13, all of the granules will come into contact with the adjacent granules thus forming the solid bed. If desired, all of the liquid 17 may be removed in which case the outlet pipe would be located at the bottom of the tank.

The procedure of mixing the two layers 10 and 11 is as follows, assuming that the layers are disposed one above the other in the tank. With a vent valve 16 opened, the suspension liquid 17 is next introduced into the tank 12 until the voids in the material layers are filled and the level has risen preferably to a point well above the top of the submerged layers as shown in Fig. 1. Compressed air is then admitted through the nozzle 19 at a rate sufficient to agitate the liquid and initiate movement of all of the particles of both materials. The latter thus become mixed homogeneously and evenly distributed throughout the liquid.

Now while the turbulent condition of the liquid is continued, a valve 22 is opened to allow the liquid to flow out of the tank gradually thus lowering the liquid level. This is continued at least until the volume of the liquid is less than the voids in the mixed materials as evidenced by a fall in the level below the top of the bed. The flow of air is then interrupted thus leaving the bed of the mixed materials in the tank in condition for use. Sometimes it is desirable to reduce the rate of agitation during the withdrawal of the liquid while always maintaining a circulation sufficient to prevent stratification by settling. This may be accomplished simply by adjusting a valve 23 to reduce the rate of air flow through the nozzle 19. Also, if desired, the gas for agitation may during the final part of the mixing operation be introduced into the liquid through the pipe 20 while the liquid is being withdrawn through the pipe 15.

We claim as our invention:

1. The method of mixing a plurality of granular materials of different densities to form a homogeneous body comprising submerging said materials in a body of liquid, agitating the liquid to intermix the materials and maintain the granules thereof free in a state of homogeneous suspension, and while continuing such agitation, gradually reducing the level of the liquid of said body to bring the different granules into mechanical contact with each other and form the same into a homogeneous mixture.

2. The method of mixing a plurality of granular materials of different densities to form a homogeneous body comprising agitating said materials in a tank containing a body of liquid sufficiently large to permit free movement of all of the granules, and while continuing the agitation, gradually withdrawing said liquid from said tank at least until all of the granules of both materials come into mechanical contact with the immediately adjacent granules and form a mixture.

3. The method as defined in claim 2 in which the withdrawal of the liquid from the tank is started at a point disposed between and spaced from the upper and lower ends of the resultant body of mixed materials and is later continued from the bottom of the tank.

4. The method as defined in claim 2 in which the agitation of the materials and liquid is effected by air introduced under pressure in the tank first into the bottom of the tank and then at a point disposed between the upper and lower ends of the resulting body of mixed materials.

5. The method as defined in claim 2 in which the rate of agitation of the materials and liquid is reduced during the withdrawal of the liquid.

AUGUST C. REENTS.
DONALD M. STROMQUIST.

REFERENCES CITED

The following references are of record in the file of this patent:

UNITED STATES PATENTS

| Number | Name | Date |
|---|---|---|
| 683,327 | Prinz | Sept. 24, 1901 |
| 923,571 | Paterson | June 1, 1909 |
| 1,000,689 | Paterson | Aug. 15, 1911 |
| 2,125,913 | Goebels | Aug. 9, 1938 |